(12) United States Patent
Wilson et al.

(10) Patent No.: US 6,621,949 B2
(45) Date of Patent: Sep. 16, 2003

(54) FIBER OPTIC SWITCH PACKAGE AND A METHOD OF ASSEMBLING A FIBER OPTIC SWITCH PACKAGE HAVING AN INVERTED RING STRUCTURE

(75) Inventors: Howard P. Wilson, Hudson, WI (US); Gary F. Nault, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 21 days.

(21) Appl. No.: 09/808,638

(22) Filed: Mar. 14, 2001

(65) Prior Publication Data

US 2002/0131672 A1 Sep. 19, 2002

(51) Int. Cl.[7] .................................................. G02B 6/26
(52) U.S. Cl. ........................................ 385/16; 385/18
(58) Field of Search .............................. 385/16, 18, 15, 385/19, 17, 20–34

(56) References Cited

U.S. PATENT DOCUMENTS

| | | | |
|---|---|---|---|
| 4,644,096 A | | 2/1987 | Gutierrez et al. |
| 5,117,068 A | | 5/1992 | Seieroe et al. |
| 5,448,661 A | * | 9/1995 | Takai et al. ................... 385/24 |
| 5,664,034 A | * | 9/1997 | Mock ........................... 385/16 |
| 5,920,665 A | * | 7/1999 | Presby ......................... 385/16 |
| 6,058,228 A | * | 5/2000 | Fasanella et al. .............. 385/17 |
| 6,112,002 A | * | 8/2000 | Tabuchi ....................... 385/50 |
| 6,301,403 B1 | * | 10/2001 | Heanue et al. ................ 385/18 |

OTHER PUBLICATIONS

"Fast Fiber Optic 1×4 Switch", http://www.sercalo.com, Sercalo Microtechnology Ltd., 2 pages (Jul. 13, 2000).
Mortenson et al., "A Fiber Optic Switch Package and a Method of Assembling a Fiber Optic Switch Package", U.S. patent application Ser. No. 09/768,926 filed in the U.S. Patent and Trademark Office on Jan. 24, 2001 (17 pages).
"Multimode Fiber Optic Switch", http://www.litton–ps.com, Litton Poly–Scientific, 2 pages (Feb. 2000).
Wilson, Howard P., "Sercalo 1×4 Fiber Optic Switch 00–055—Construction Analysis", 4 pages (Sep. 19, 2000).

\* cited by examiner

*Primary Examiner*—Jean F Duverne
(74) *Attorney, Agent, or Firm*—Merchant & Gould, P.C.

(57) ABSTRACT

A fiber optic switch package and method of assembling the same with improved protection of the fibers and simple assembly. A fiber support device has passages that receive optic fibers and help align those fibers with respect to an optic switch component. In addition, the fibers that extend into the interior of the fiber support device are isolated from strains that may occur on the fibers that extend external to the fiber support device.

30 Claims, 7 Drawing Sheets

FIBER OPTIC SWITCH PACKAGE AND A METHOD OF ASSEMBLING A FIBER OPTIC SWITCH PACKAGE HAVING AN INVERTED RING STRUCTURE

FIELD OF THE INVENTION

The present invention is directed to a fiber optic switch package and a method of assembling said package, and, more particularly, a microelectromechanical systems (MEMS) based fiber optic switch package for an optical component.

BACKGROUND OF THE INVENTION

Elaborate structures and manual assembly techniques are presently required to contain and protect optic fibers exiting from packages containing semiconductor devices. It is particularly important that the optic fibers of such components be protected from damage. Several approaches have been used. One example is the use of fiber pipes as seen on costly 14 pin butterfly packages that house pump laser devices and other similar devices. Another example is the use of epoxy to encapsulate a subassembly of a MEMS chip to optic fibers which is then covered with a conventional TO-8 can style cover. A further assembly is then required to reinforce and contain the fibers and support strain relief components, adding cost and complexity.

It is thus desirable to provide a package for housing fiber optics interfacing with semiconductor devices and protecting the fibers that exit from the housing. It is also desirable to provide a package that prevents or substantially reduces optical losses due to excessive bending of the fibers. Furthermore it is desirable to provide a package that provides strength and isolation from mechanical stresses outside the package on the semiconductor device housed in the package and the fibers exiting the package.

DETAILED DESCRIPTION OF THE PRESENTLY PREFERRED EMBODIMENTS

Figure 1:
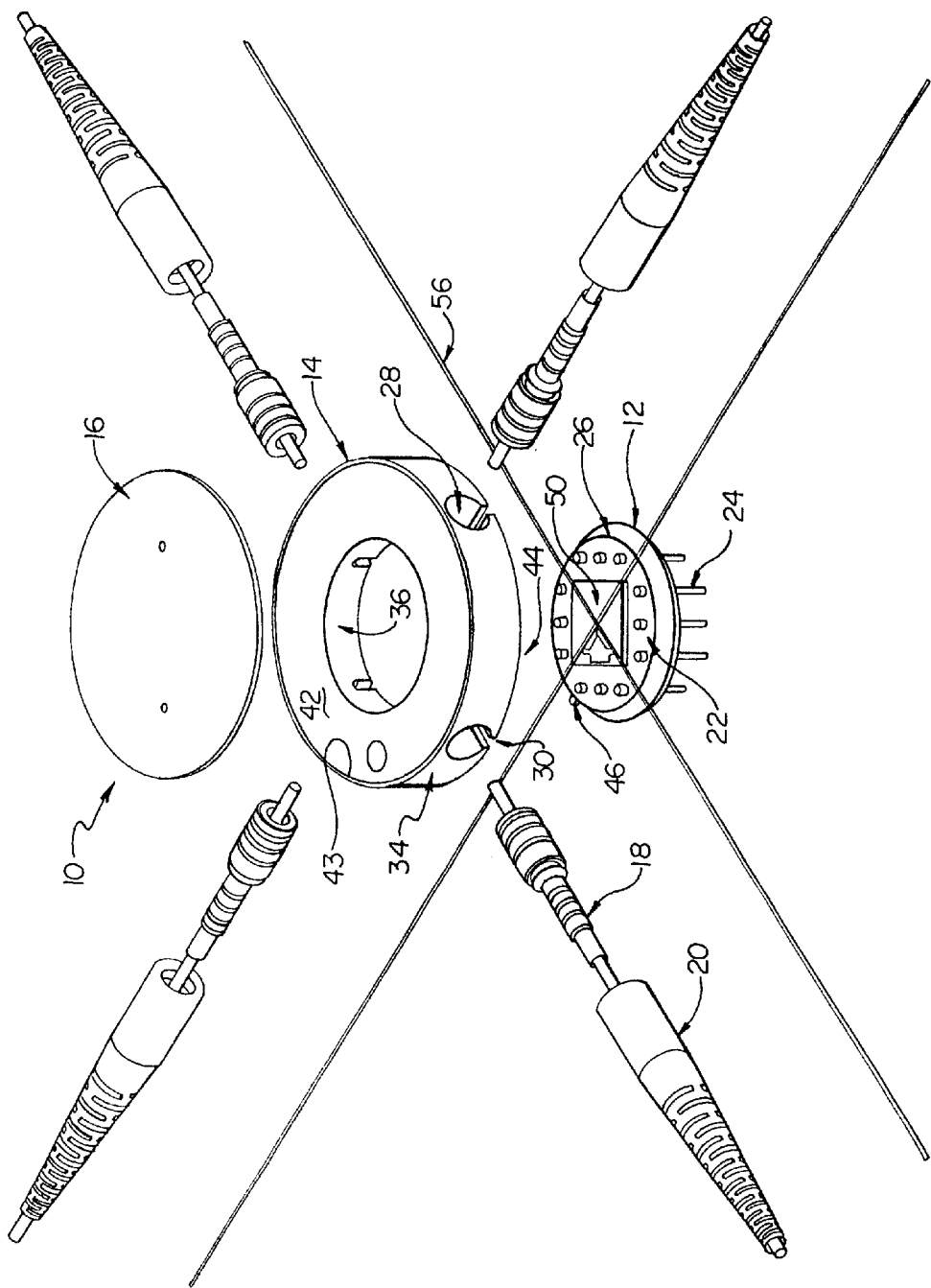
FIG. 1 is an exploded perspective view of a package according to a preferred embodiment of the present invention.

FIG. 1 is an exploded perspective view of a package according to a preferred embodiment of the present invention. The package assembly 10 includes a header 12, a fiber support device 14, a cover 16, a plurality of housings 18 and a plurality of strain relief boots 20. The header 12 is preferably a TO-8 device as is well known to those of ordinary skill in the art. The header 12 has a platform 22 and a plurality of leads 24 that extend through the platform 22. The platform 22 has a rim 26 and a locator tab 46 located on the rim 26. The locator tab 46 ensures that there is proper alignment between the header 12 and the fiber support device 14 as will be described in detail hereinafter. As is well known to those of ordinary skill in the art, the leads 24 of the header 12 are inserted into holes in a printed circuit board or socket (both not shown) to electrically couple the header 12 to the printed circuit board to receive power and electrical control signals therefrom.

The fiber support device 14 is preferably in the shape of an annular ring. The fiber support device 14 has a top surface 42, a bottom surface 44, an inner wall 36 and an outer wall 34. On a top surface 42 of the fiber support device 14 is a circular recess 43 which aids in the placement of the cover 16 as will be described in detail hereinafter. The fiber support device 14 also has a plurality of passages 28 that extend from the inner wall 36 to the outer wall 34. In this preferred embodiment the passages 28 also extend through the bottom surface 44 of the fiber support device 14. Each passage has a shoulder 32 (see FIG. 4) formed therein about midway in the passage.

While the fiber support device 14 is shown as a ring, it will be appreciated that it may have other shapes depending on the shape of the header 12 on which it will be disposed. For example, the fiber support device 14 may be rectangular or square in shape. In the preferred embodiment shown, the fiber support device 14 is dimensioned so that its inner wall 36 abuts the rim 26 formed on the platform 22 of the header 12.

Figure 4:
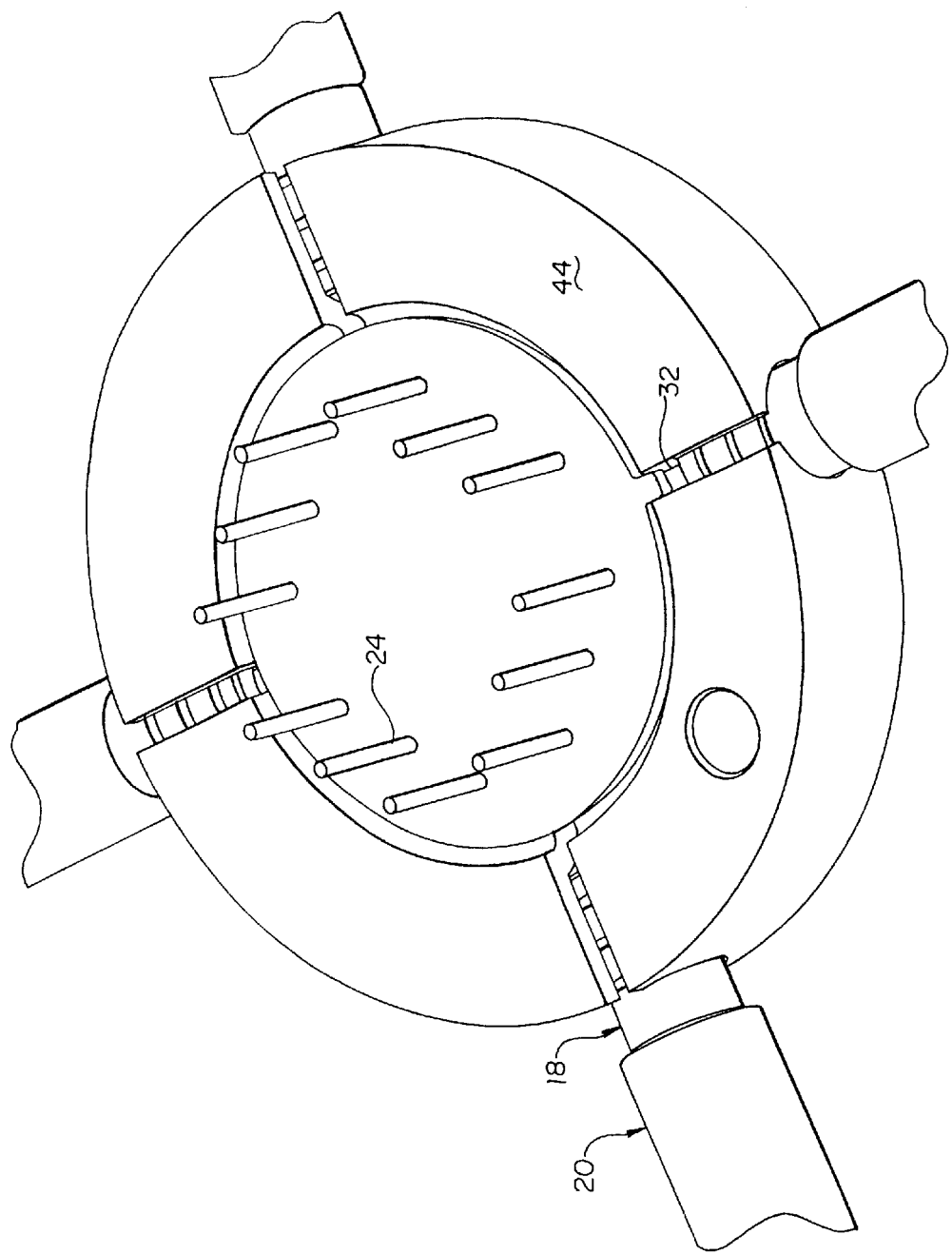
FIG. 4 is a top perspective view of the package according to a preferred embodiment oF the present invention fully assembled.
Figure 5:
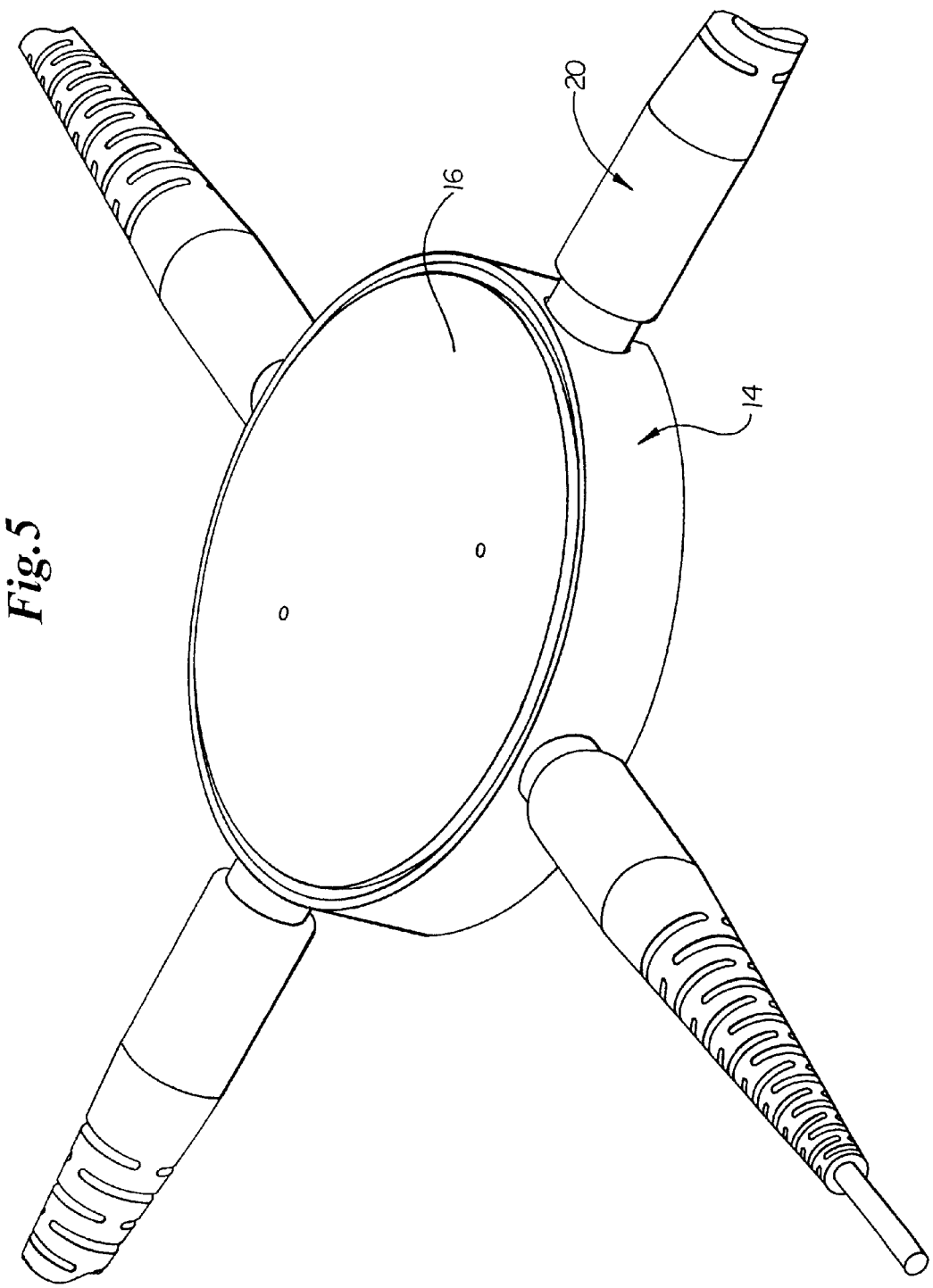
FIG. 5 is a top perspective view of the package according to a preferred embodiment of the present invention fully assembled.

The housings 18 are dimensioned to partially fit inside the passages 28 as can best be seen in FIG. 4. The shoulder 32 prevents the housing 18 from extending into an interior region 32 of the fiber support device 14. The strain relief boot 20 fits over a distal portion of the housing 18 as can be seen in FIG. 5. The cover 16 is dimensioned to fit within the circular recess 43 formed in the top surface 42 of the fiber support device 14 and cover an interior region 32 of the device 14. The assembly of the package will be described in detail hereinafter.

In a preferred embodiment the fiber support device 14 is made of KOVAR™ (ASTM Alloy F15) so that it matches the thermal expansion coefficient of the header 12 and minimizes the difference in thermal expansion with the semiconductor component which is typically made of silicon and the glass optic fibers. The fiber support device 14 could alternatively be manufactured from alternate materials providing similar benefits in thermal expansion, mechanical support and resistance to diffusion of various elements into the interior region 32 of the device 14. The cover 16 is also made of KOVAR™, the housings 18 and strain relief boots 20 are made of brass and plastic, respectively. The header 12 is commercially available from various suppliers including Shinko, Olin/Aegis and Airpax.

Figure 2:
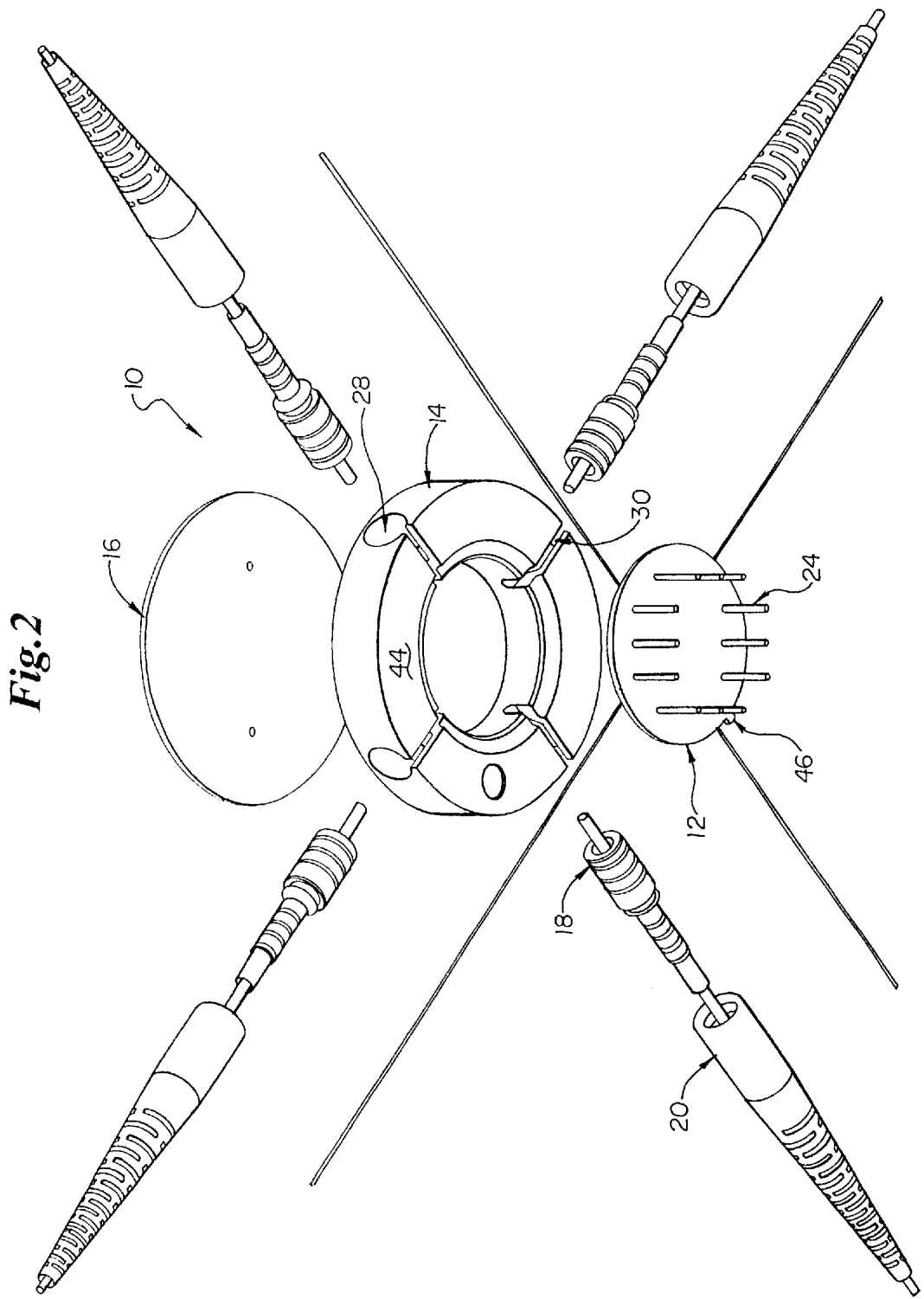
FIG. 2 is a bottom perspective view of the fiber support device shown in FIG. 1.

FIG. 2 is an exploded perspective view from the bottom of the fiber support device 14 shown in FIG. 1. Because the package 10 is designed in a preferred embodiment of the invention to particularly house a MEMS semiconductor device having four fibers extending therefrom, four passages 28 are formed in the device 14. If more or less fibers were to be used, the number of passages would similarly increase or decrease respectively or unused passages could be plugged. As seen, all of the passages extend through the bottom surface 44 of the device 14. The opening 30 in the bottom surface 44 of the device 14 in any of the grooves forms a locator groove 48 one of which will mate with the locator tab 27 on the platform 22 of the header 12 when the package 10 is properly assembled depending on the orientation of the device 14.

The assembly of package 10 will now be described with reference to FIGS 1–5. A semiconductor device, in this preferred embodiment, a MEMS chip 50 is placed on the platform 22 of the header 12 and bonded thereto using conventional chip attach materials such as epoxy or silicon adhesive or metallic solder. The leads 24 of the header 12 are wire bonded to leads (not shown) on the MEMS chip 50. Next, fiber 56, preferably wave guide fiber, are positioned in channels 54 formed in the MEMS chip 50. Because the chip 50 and fibers are easily accessible, fiber grippers (not shown) can be used to help properly position the fibers as seen in FIG. 1.

Next, the fiber support device 14 is mounted on the header is that it encircles the chip. More specifically, the openings 30 in the bottom surface 44 of the device 14 are aligned over the fibers 56 and the device 14 is lowered onto the header 12. The fibers enter passages 28 through the openings 30 in the bottom surface of the device. Also, one of the openings additionally functions as a locator groove which mates with the locator tab 27 on the rim 26 of the header 12.

Figure 3:
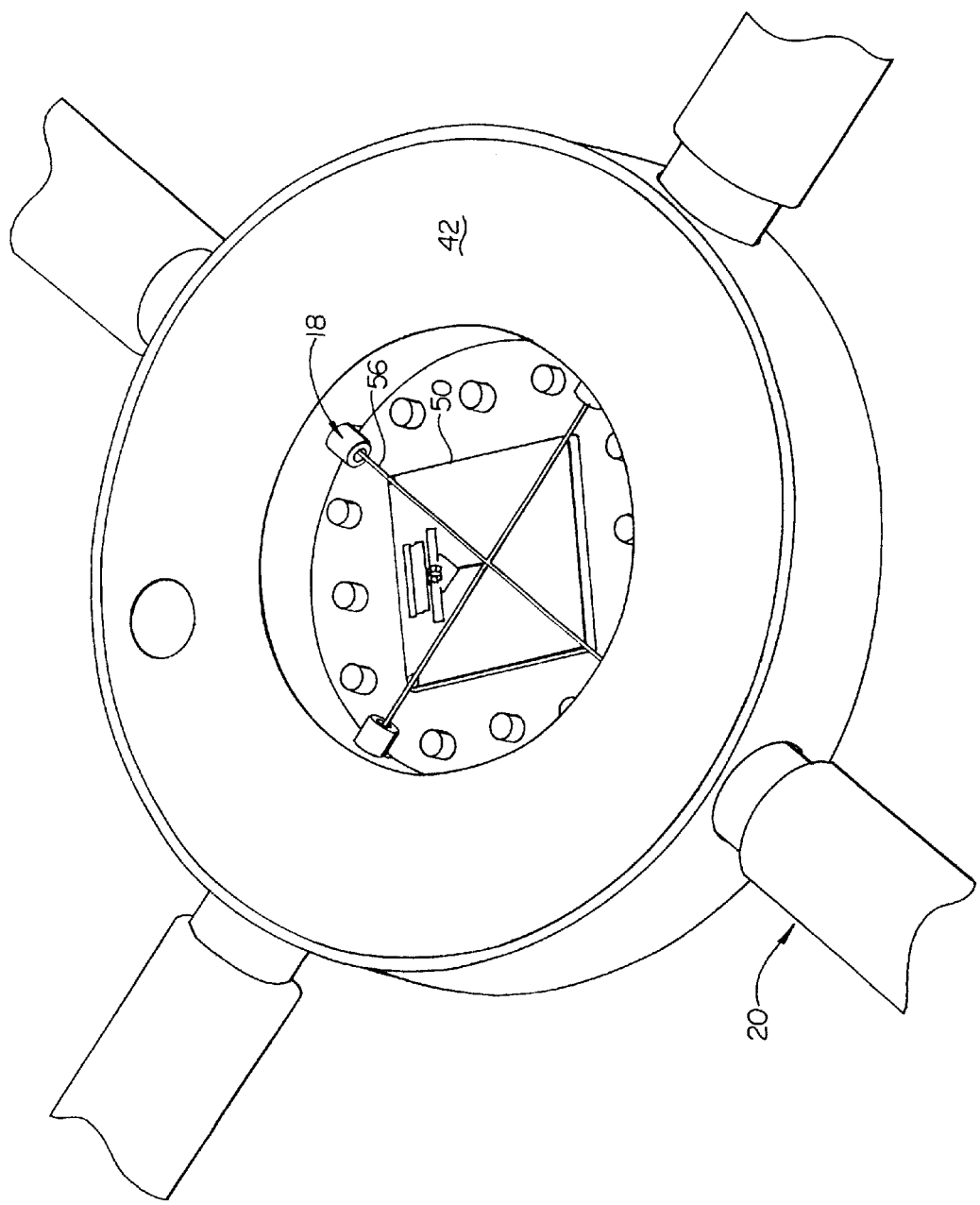
FIG. 3 is a magnified perspective view of the package shown in FIG. 1 according to a preferred embodiment of the present invention partially assembled.

The fiber support device 14 is then adhesively bonded to the rim 26. Alternatively, the fiber support device 14 could be soldered or brazed onto the rim 26. A housing 18 and buffer tubes 52 are then slid over each fiber 56. The buffer tubes 52 are inserted preferably all the way through the passages 28 while the housing 18 is only partially inserted in a respective passage 28. The cover 16 is then attached adhesively with epoxy, for example, or with metallic solder as seen in FIG. 5. A strain relief boot 20 is then slid over each fiber 56, buffer tube 52 and a portion of each housing 18. FIGS 3 and 4 are magnified perspective views of the assembled package.

Thus, the fiber support device 14 encircles the MEMS chip 50 and protects the chip 50 and provides additional structure by the passages 28 to capture and hold the fiber. This greatly simplifies assembly since once the fibers are properly positioned they are maintained in their proper position. The fiber support device 14, housings 18, buffer tubes 52 and fibers 56 are all glued together in the passage 28 area. Alternatively, these elements may be soldered together for a hermetically sealed version of the assembly. This provides strain relief to the assembly since any pull on the fibers 56 will not result in a pull on the fibers 56 in the interior region 32 of the fiber support device 14. The strain relief boots 20 maintain minimum bend radii on the fibers 56 to prevent optical losses. Finally, the cover 16 provides additional protection to the MEMS chip 50.

Figure 6:
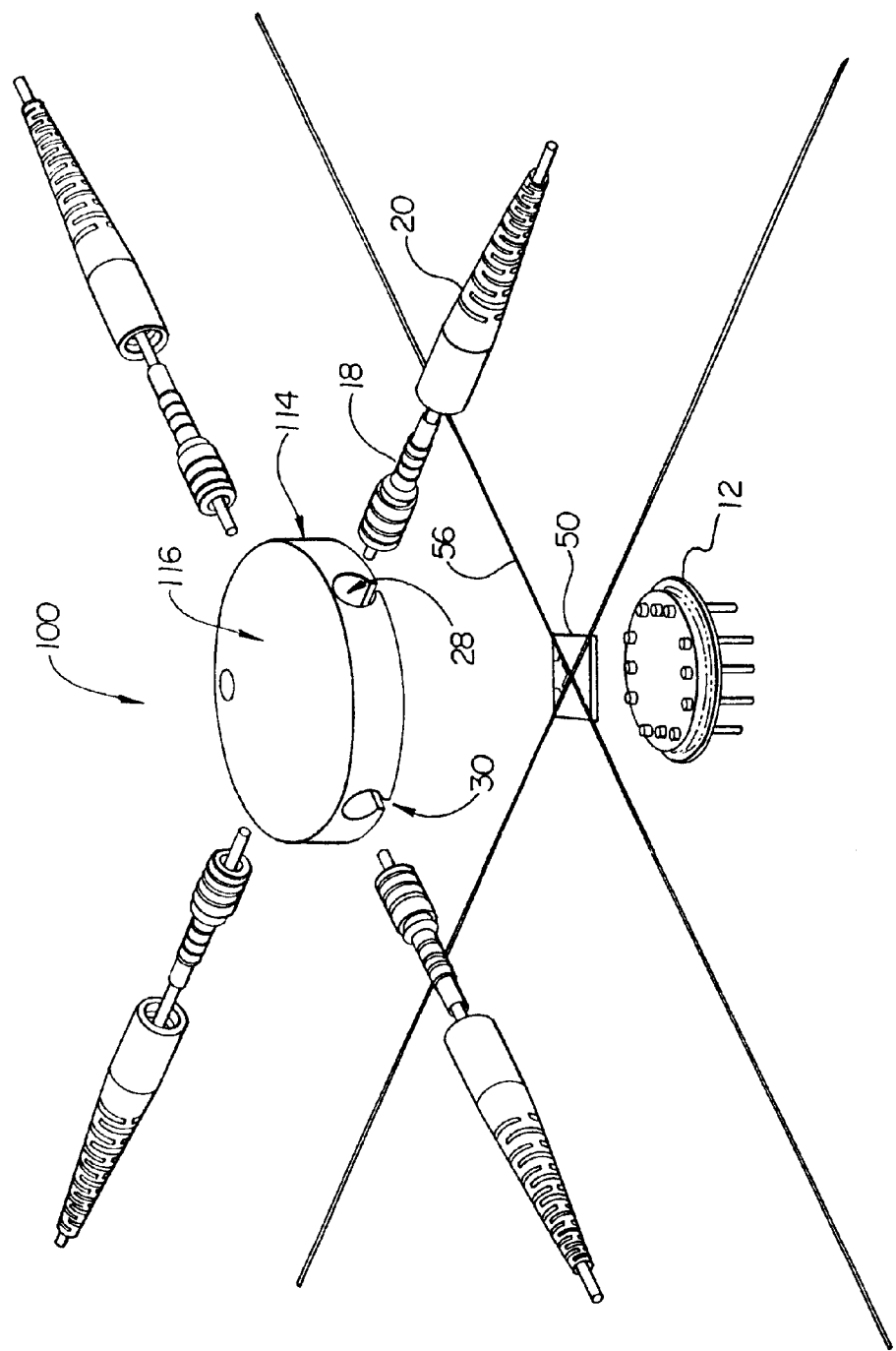
FIG. 6 is a perspective view of a package according to another preferred embodiment of the present invention fully assembled.
Figure 7:
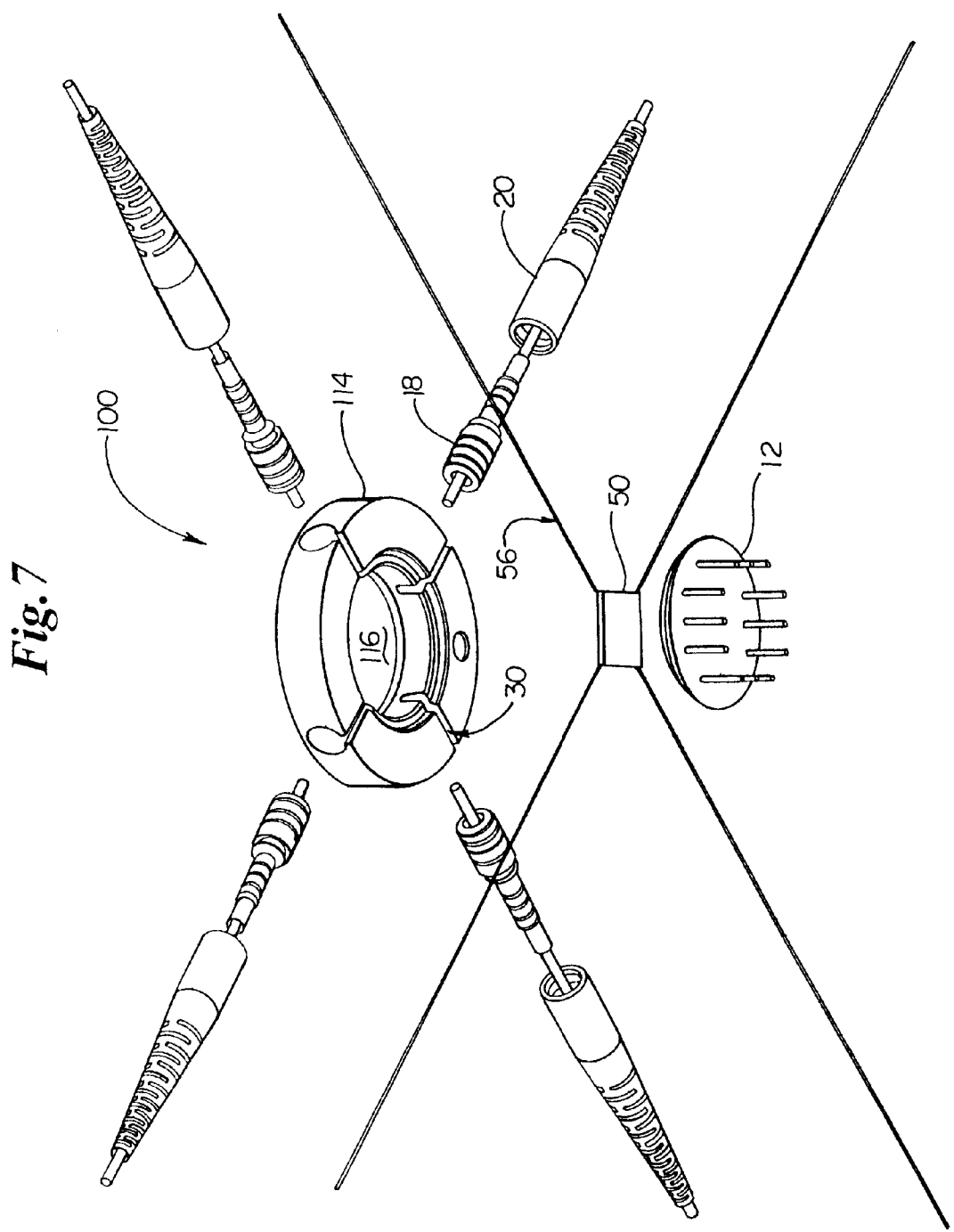
FIG. 7 is an exploded perspective view of the fiber support device shown in FIG. 6.

FIGS. 6 and 7 are exploded perspective views of a fiber support device according to another preferred embodiment of the present invention. The device 100 is similar to the previously described fiber support device except that the ring 114 and cover 116 are formed as an integral unit, i.e. as one piece.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A optical component package comprising:
   a platform;
   a fiber support structure having a top surface, a bottom surface, an inner wall and an outer wall wherein the bottom surface of the fiber support structure is positioned on the platform;
   a circuit chip disposed on the platform within an interior region of the fiber support structure;
   a plurality of passages formed in the fiber support structure wherein each passage extends from the inner wall of the fiber support structure to the outer wall of the fiber support structure and through the bottom surface of the fiber support structure; and
   a plurality of fibers located on the circuit chip and each fiber extending from the circuit chip through a respective one of the passages.

2. The package of claim 1 wherein the platform is a TO-8 device.

3. The package of claim 1 wherein the fiber support structure is an annular ring.

4. The package of claim 3 wherein the platform has a rim on which the annular ring is disposed.

5. The package of claim 1 wherein the circuit chip is a MEMS chip.

6. The package of claim 1 wherein the fiber support structure is made of KOVAR™.

7. The package of claim 1 further comprising a cover disposed on a top surface of the fiber support structure.

8. The package of claim 7 wherein the top surface of the fiber support structure has a circular recess formed therein and the cover is dimensioned to fit within the recess.

9. The package of claim 7 wherein the cover is integral with the fiber support structure.

10. The package of claim 1 wherein the plurality of fibers are waveguides.

11. The package of claim 1 further comprising a locator tab on the platform and a corresponding location groove formed on a bottom surface of the fiber support structure, wherein the locator tab and location groove mate when the platform and fiber support structure are properly aligned.

12. The package of claim 1 wherein the locator groove is formed by one of the plurality of passages.

13. The package of claim 1 wherein the top surface is a solid disc.

14. The package of claim 1 further comprising a plurality of housings wherein each housing fits over a respective fiber and is partially inserted in a respective passage.

15. The package of claim 14 further comprising a plurality of strain relief strain relief boots wherein each strain relief boot fits over a portion of a respective housing and a portion of a respective fiber.

16. The package of claim 15 further comprising a plurality of buffer tubing wherein each buffer tube is slid over a respective fiber and through a respective passage so that the buffer tube extends in an interior region of the fiber support structure.

17. A fiber support device comprising:
   an annular ring having a top surface, a bottom surface, an inner wall and an outer wall wherein the inner wall defines an interior region and the outer wall defines an exterior region; and
   a passage formed in the annular ring wherein the passage extends from the inner wall to the outer wall and through the bottom surface of the annular ring and the passage is shaped to support a fiber extending from the interior region to the exterior region.

18. The device of claim 17 further comprising:

a plurality of passages formed in the annular ring wherein each passage extends from the inner wall to the outer wall and through the bottom surface of the annular ring wherein each passage is shaped to support a fiber extending from the interior region to the exterior region.

19. The device of claim 18 wherein the passage at the outer wall of the ring is annular in shape and the passage at the inner wall of the ring has a notch shape.

20. The device of claim 19 further comprising a shoulder located in the passage between the inner and outer wall wherein the passage is annular in shape from the shoulder to the outer wall and the passage has a notch shape from the shoulder to the inner wall.

21. The device of claim 17 further comprising a cover disposed on the top surface of the annular ring.

22. The device of claim 21 wherein the top surface of the fiber support structure has a circular recess formed therein and the cover is dimensioned to fit within the recess.

23. The device of claim 21 wherein the cover is integral with the fiber support structure.

24. The device of claim 21 wherein the cover is circular.

25. The device of claim 17 wherein the annular ring is dimensioned to fit on a TO-8 device.

26. The device of claim 17 wherein the annular ring is made of KOVAR™.

27. A method of assembling an optical component package, the method comprising the steps of:

(a) disposing a circuit component on a header;

(b) disposing a plurality of fibers on the circuit component;

(c) disposing a fiber support device on the header, the fiber support device having a plurality of passages formed therein, the passages extending form an interior region of the device to an exterior region of the device, the fiber support device having a top surface and a bottom surface wherein the passages extend through the bottom surface;

(d) sliding a fiber tubing over each fiber wherein the fiber tubing extends through the passage of the fiber support device;

(e) sliding a housing over each fiber tubing and partially inserting the housing in a respective passage; and (f) bonding the housing, fiber tubing and fiber in said passages.

28. The method of claim 27 further comprising the step of sliding a strain relief boot over a portion of the fiber tubing and housing.

29. The method of claim 27 wherein step (f) of bonding comprises the step of gluing the housing, fiber tubing and fiber in said passages.

30. The method of claim 27 wherein step (f) of boding comprises soldering the housing, fiber tubing and fibers in said passages.

* * * * *

UNITED STATES PATENT AND TRADEMARK OFFICE
CERTIFICATE OF CORRECTION

PATENT NO.    : 6,621,949 B2                                          Page 1 of 1
DATED         : September 16, 2003
INVENTOR(S)   : Wilson et al.

It is certified that error appears in the above-identified patent and that said Letters Patent is hereby corrected as shown below:

Column 1,
Line 39, "Brief Description of the Drawing" should read -- Brief Description of the Drawings --
Line 50, "embodiment oF the present invention" should read -- embodiment of the present invention --

Column 6,
Line 6, "extending form an interior region" should read -- extending from an interior region --

Signed and Sealed this

Ninth Day of December, 2003

JAMES E. ROGAN
*Director of the United States Patent and Trademark Office*